April 3, 1928.
H. K. RUTHERFORD
1,664,948
DATA TRANSMITTER AND RECEIVER
Filed Aug. 22, 1924
2 Sheets-Sheet 1
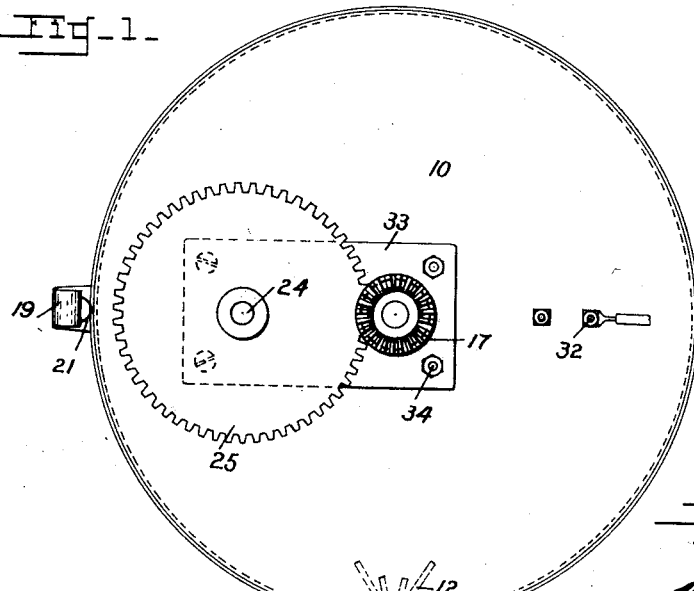
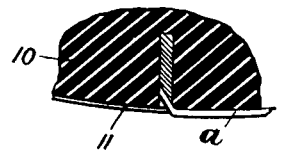
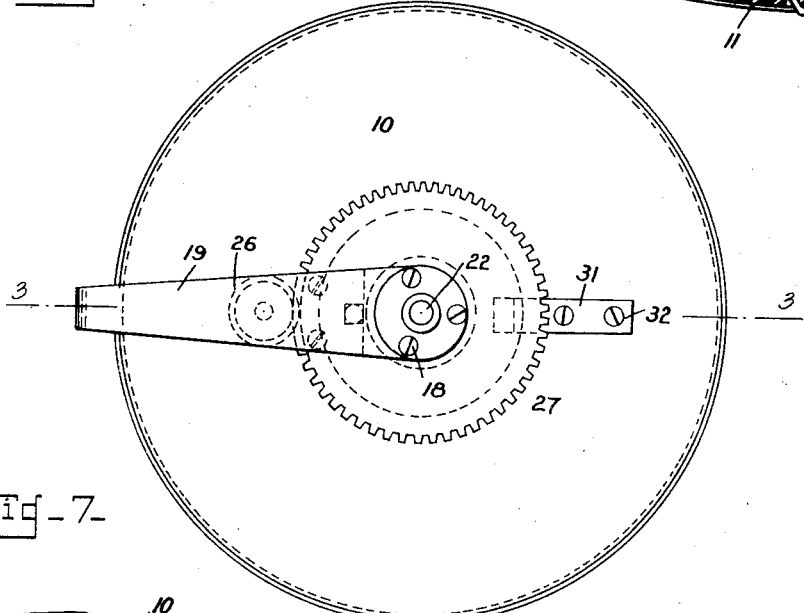
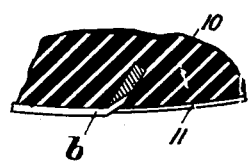
INVENTOR
Harry K. Rutherford.
BY
ATTORNEY April 3, 1928.
H. K. RUTHERFORD
1,664,948
DATA TRANSMITTER AND RECEIVER
Filed Aug. 22, 1924
2 Sheets-Sheet 2
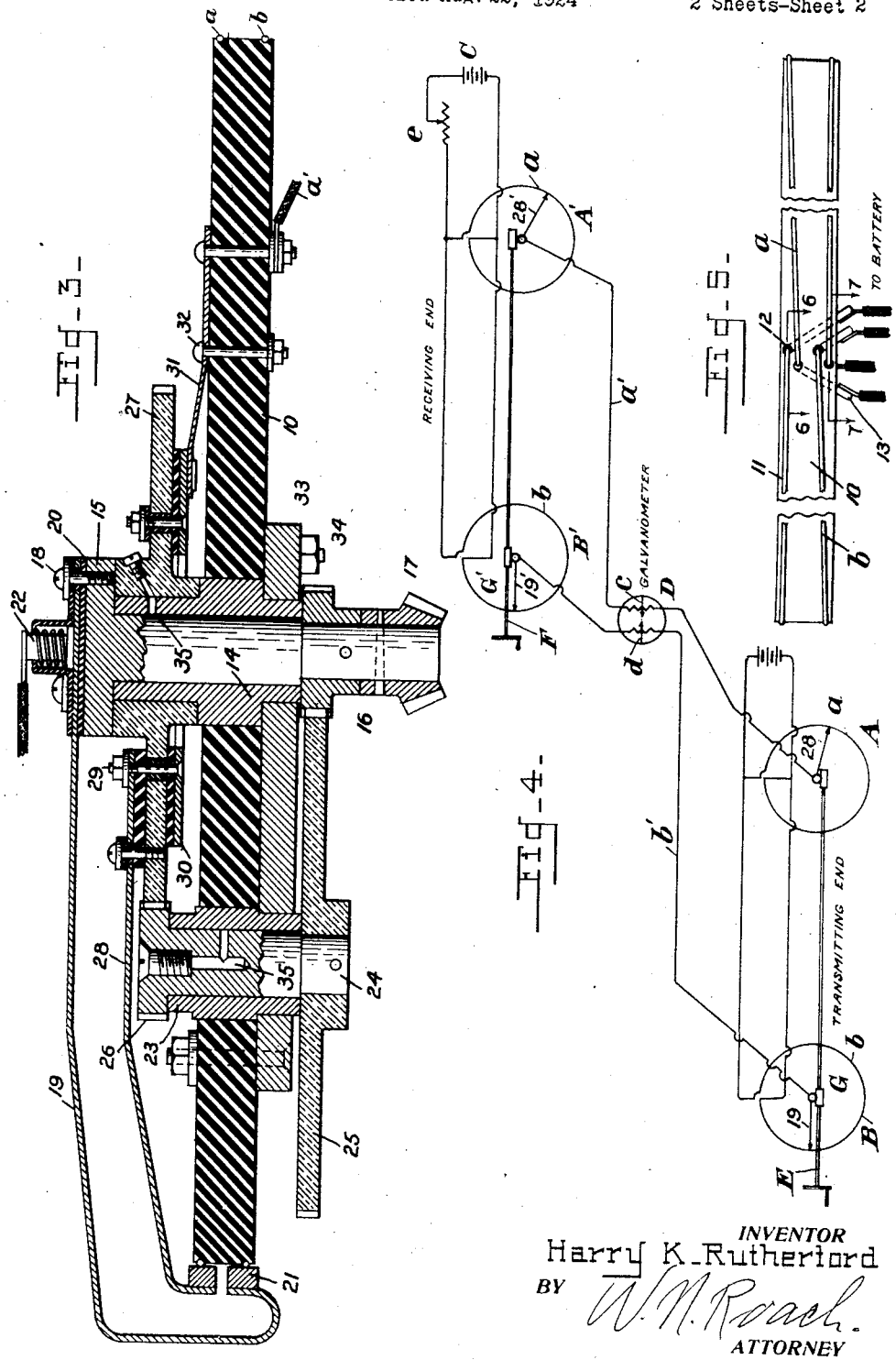
INVENTOR
Harry K. Rutherford
BY W. N. Roach
ATTORNEY Patented Apr. 3, 1928.

1,664,948

UNITED STATES PATENT OFFICE.

HARRY K. RUTHERFORD, OF CAMBRIDGE, MASSACHUSETTS.

DATA TRANSMITTER AND RECEIVER.

Application filed August 22, 1924. Serial No. 733,595.

(GRANTED UNDER THE PROVISIONS OF THE ACT OF MARCH 3, 1883, 22 STAT. L., 625.)

The invention described herein may be used by the Government, or any of its officers or employees in prosecution of work for the Government, or by any other person in the United States, without payment to me of any royalty thereon, in accordance with the act of March 3, 1883.

The subject of this invention is a data transmitter and receiver intended primarily for use in military fire control systems.

The telephone, telegraph, etc., when employed for the purposes indicated above are cumbersome, inconvenient, slow in operation and subject to error.

The purpose of this invention is to enable one who operates an instrument, for example a telescope, in such a manner as to keep it directed on a moving object, to indicate to a receiving operator, continuously and instantaneously and without the use of a telephone or like means, the direction and degree of travel of his telescope so that the receiving operator in the distant station will have the observed data for use in making computations to be transferred to a gun sight, or for other purposes.

The principle of operation employed to effect the above purpose is similar to that of the well-known Wheatstone bridge in that a known electrical resistance is balanced against an unknown resistance until the two become equal thus determining the value of the unknown. In the application of the foregoing principle the direction in which an observer's telescope is pointed is indicated to the receiving operator in terms of an unknown electrical resistance which the receiving operator measures by adjusting his receiver until a resistance which he has the means for measuring balances the unknown resistance thus making the latter known. In the actual apparatus, however, the receiving operator simply adjusts his receiver until the balance of resistances is indicated on a galvanometer, the act of making this adjustment automatically setting the observer's data into a recording mechanism (not shown) where it is used or otherwise indicating it as may be desired.

It will, consequently, be unnecessary for either the observing or the receiving operator to read any scales or dials, as would ordinarily be required, thus rendering it practically impossible to make an error in transmitting data. In addition, the observer may move his telescope continuously in one direction, or he may move it at any speed, as, for example, in changing from one target to another, without disarranging the transmitting device or causing the receiving mechanism to get out of step with the sending.

Many other possible applications of the invention, including the features and advantages of simplicity, accuracy and reliability, will be readily apparent from the specification.

To avoid the use of an extremely long resistance wire and to secure accurate indication of the position of the observer's telescope the total resistance is divided in the transmitter and in the receiver into a coarse and a fine indication, the contact arms of each instrument rotating in fixed relation to each other.

The principal objects of the invention, briefly stated, are: to provide an instrument which may either send or receive data; to utilize the principle of the Wheatstone bridge in a plurality of resistance coils disposed in parallel relationship; to divide the total resistance into a coarse and a fine indication thereby securing compactness and accuracy; to provide double volt meters in a single housing to form a galvanometer element; to rotate the contact arms of the resistance coils in fixed relation to each other; and, to actuate the contact arm of the sending instruments through the instrumentality of a telescope or other instrument in the hands of the transmitting operator.

To these and other ends, the invention consists in the construction, arrangement, and combination of elements, described hereinafter and pointed out in the claims forming a part of this specification.

A practical embodiment of the invention is illustrated in the accompanying drawings, in which, Fig. 1 is a bottom plan view of the sending or receiving instrument;

Fig. 2 is a plan view;

Fig. 3 is a vertical sectional view taken on the line 3—3 Fig. 2;

Fig 4 is a diagrammatic view of the sending and receiving arrangement and the electrical circuits;

Fig. 5 is a view in side elevation of the insulator block showing the method of attaching the galvanometer circuit;

Fig. 6 is a fragmentary sectional view taken on the line 6—6 of Fig. 5; and

Fig. 7 is a fragmentary sectional view taken on the line 7—7 of Fig. 5.

Referring to the drawings by numerals of reference:

A transmitting or receiving instrument comprises an insulator block 10 in the form of a disc formed with a plurality of overlapping spaced grooves 11 about its periphery which terminate in divergent apertures 12 extending at an incline to the under face of the disc.

Disposed in the grooves and held thereby against lateral movement are resistance wires $a$ and $b$ which extend beyond the circumference of the block, the overlapping ends being anchored by soldering or otherwise to terminal pins 13 disposed in the apertures 12 and suitably connected to a source of electrical energy, such as the battery C, Figure 4.

Positioned in the center of the disc 10 and supported by a reenforcing plate 33 is a metal bushing 14 which serves as a bearing for a shaft 15 which extends some distance above and below the disc, its under portion carrying pinions 16 and 17. The lower pinion 17 is adapted to be engaged by a complementary member formed on or attached to the observer's telescope or other instrument and constrained to rotate in accordance therewith.

Secured to the upper end of the shaft by screws 18 and rotatable therewith, is a contact arm 19 spaced from the shaft by an insulator disc 20. The contact arm is in the form of a leaf spring extending beyond the circumference of the disc and turned down to position a contact block 21 carried thereby in engagement with the resistance ring $b$ which forms one element of what will hereinafter be termed the B circuit. A contact 22 suitably supported by and in sliding engagement with the rotatable contact arm 19 completes the electrical circuit from the arm to a galvanometer D by a connection $b'$ as indicated diagrammatically in Figure 4.

Positioned off-center in the disc 10 is a bushing 23 supported similarily to the bushing 14, which serves as a bearing for a shaft 24 extending above and below the block, its under portion carrying a gear 25, which meshes with the pinion 16 on the shaft 15. Formed integrally with the upper end of the shaft 24 is a pinion 26 which meshes with a gear 27 rotatably mounted on the bushing 14 and held in place thereon by the shaft 15.

Secured to the gear 27 and suitably insulated therefrom is a contact arm 28 disposed underneath the arm 19 and adapted to contact with the resistance ring $a$, which forms one element of an electrical circuit hereinafter designated as the A circuit. The circuit to galvanometer D from the contact arm 28 is completed through the bolt 29 properly insulated from the gear 27 and through an annular conductor 30 carried on the under side of the gear and insulated therefrom which, during rotation, is engaged by a brush 31 secured to the disc by means of bolts 32, one of which receives the connection $a'$ from the galvanometer.

By properly selecting the correct ratio between the shaft 15 and the gear 27 any desired ratio between the speeds of rotation of the contact arms 19 and 28 may be obtained, although a ratio of one hundred to one is preferred in this instance.

The metal plate 33 secured to the under side of the insulator block 10 by bolts 34 strengthens the latter against warping and provides a suitable rigid support for the metal bushings 14 and 23. The metal plate may be formed with suitable attachments (not shown) for mounting the instrument to a fixed base.

The gear 27 and the shaft 24 are formed with passages 35 for providing lubrication to the moving parts.

When the instrument is used as a transmitter the driving power for the shaft 15 is supplied through the pinion 17 and a suitable connection G to the observer's telescope represented by the letter E in Figure 4. When the instrument is used as a receiver it is associated with a recording mechanism represented by the hand wheel and shaft F of Figure 4 suitably connected to the pinion 17 by a worm gear G' so that manipulation of the hand wheel F transmits its motion to the shaft 15 and also to the recording mechanism with which it is associated.

Referring to Figure 4, which diagrammatically illustrates the complete electrical circuits $A^{A'}$ and $B^{B'}$ from the transmitting to the receiving end, the resistance circles of each instrument are represented by $a$ and $b$ which are identical in all respects and whose ends overlap as shown to avoid a break in the circuit. The several resistances are energized by means of the batteries C consisting of a few dry cells. At $e$ is provided an adjustable resistance by mean of which the voltage between the ends of the resistances $a$ and $b$ in the receiver may be made equal to that across the resistances in the transmitter. This adjustment will be described more fully hereinafter.

The contact arms 28—28' and 19—19' of the A and B circuits respectively, are indicated as rotating about the center of the resistance circles $a$ and $b$ and making contact with the circles at their outer ends. The rotation of the receiving contact arms is indicated as controlled by the hand wheel F of the recording mechanism, while the transmitting contact arms are driven through the instrumentality of the telescope represented by E.

As previously stated the contact arms of the B circuit are preferably arranged to make one hundred rotations to one rotation of the contact arms of the A circuit. If then the shaft of the transmitting instrument be engaged by the telscope so as to move with it, it will be evident that the position of the contact arm 28 on the transmitting resistance circle $a$ will be a measure of the position of the telescope and that the position of the contact arm 19 on the $b$ circle will indicate the same quantity on a scale magnified one hundred times. The position of the contact arm 28 is therefore a comparatively rough indication of the position of the observer's telescope while that of the arm 19 is a considerably more accurate one.

The electrical connections $a'$ and $b'$ completing the electrical circuits $A^{A'}$ and $B^{B'}$ may be of any length to connect the transmitting to the receiving instrument and pass through the galvanometer D located at the receiving end where the receiving operator may conveniently note its readings.

The galvanometer consists of two entirely independent volt meters in the same housing so that their indicating needles $c$ and $d$ may be seen at the same time by the operator. The current passing through the conductor $a'$, therefore, is indicated by the needle $c$ and that passing through the conductor $b'$ is indicated by $d$. The volt meters are both of the type which may be read in either direction from zero.

Through the hand wheel F the receiving operator may adjust the position of the contact arms 19 and 28 as required.

The operation of the device is as follows:

The transmitting and receiving operators first set the contact arms 19 and 28 of their respective instruments at a point previously agreed upon as a testing point, as for example, that shown in Figure 4 where the contact arms 28 and 19 are respectively 120° and 270° from the ends of the resistance circles reading clockwise. Since the resistances A and A' are identical, likewise B and B', and the point of contact of the arms with the circles are like distances from the ends of the $a$ and $b$ circles, it follows that no current will flow through the conductors $a'$ and $b'$ and the galvanometer indicator needles $c$ and $d$ will both read zero. If they do not read zero the resistance $e$ must be adjusted until they do read zero, this operation serving to compensate for the effects of the resistance in the battery circuit between the two stations. When this adjustment has been made the apparatus is ready to operate.

When the observing telescope is operatively connected to the shaft 15 of the transmitter both of the contact arms 19 and 28 will move continuously as the telescope follows a target, hence they will continuously vary the amount of resistance wire of the circuits A and B in the galvanometer circuit. If the contact arms 19' and 28' in the receiver have not been moved so as to correspond to the new positions of 19 and 28 of the transmitter respectively, there will be some current flowing in the conductors $a'$ and $b'$ and, consequently, the galvanometer needles will not read zero. When the receiving operator notes this condition he will restore the needles to the zero reading by operating the hand wheel F.

When the galvanometer needles have been returned to zero reading, the position of the hand wheel F is an indicator of the position of the observer's telescope. This transmitted data may be applied directly to a computing apparatus or other mechanism or read off in any desired unit by making suitable connections to the shaft F of the recording mechanism.

Since the galvanometer indicating needle $c$ gives a coarse indication of the proper setting of the hand wheel F and the indicating needle $d$ a more accurate indication of the same quantity, the operator of the receiving instrument will first bring the indicating needle $c$ to the zero position and then the needle $d$. If he continually adjusts his hand wheel to keep the needle $d$ at zero he will need pay no further attention to the needle $c$.

By thus dividing the total resistance in the transmitter and the receiver into a coarse and a fine indication and arranging to employ the fine indication many times for one complete rotation of the coarse indication, the use of an extremely long resistance wire, which it is evident would otherwise be necessary in applying the Wheatstone bridge principle to obtain the accuracy desired while keeping the device compact, is avoided. The increase in size required for a longer resistance wire would often prohibit its use for many purposes to which the present invention is particularly adapted.

While the device described is illustrated as having only a coarse and a fine indication, it is not intended to limit the invention to this number, since, obviously, a third resistance coil may be employed having an accompanying contact arm rotating at a speed between that of 19 and 28 and having a third galvanometer indicator in circuit with it thus giving an indication on the galvanometer accurate to some degree intermediate the indication shown.

If desired, another galvanometer similar to the one described may be located at the transmitting end so that the sending operator may know by observation whether or not the receiving instrument and the whole system has been adjusted. Such an arrangement has the further advantage in that it permits the sending and the receiving elements to be interchangeably used without requiring any alteration whatsoever.

When it is necessary to indicate at some intermediate station that the data transmitted has been properly received and transferred to the recording mechanism, an additional galvanometer may be placed at such intermediate station.

The resistance wires of both the sending and receiving elements may be energized by a single battery or by individual batteries, as shown, the latter method being preferable when the stations are at great distances apart.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A transmitting or receiving instrument embodying an insulator disc, a plurality of resistance elements disposed about the periphery of the disc, a reenforcing plate attached to the disc, a central and an offset bushing extending through the disc and supported by the plate, a rotatable shaft carried by each of the bushings, a pinion secured to the under portion of the central shaft, a gear secured to the under portion of the offset shaft and in engagement with the pinion, a gear embracing and supported by the central bushing, said gear engageable with the upper portion of the offset shaft, contact arms mounted on said last mentioned gear and on the central shaft and movable over the resistance elements and sliding contacts adapted to collect and transmit current from the arms.

2. A transmitting or receiving instrument embodying an insulating member, a plurality of resistance elements disposed about said member, a central shaft mounted in the member, an offset shaft adapted to be actuated by the central shaft, a gear embracing the central shaft and adapted to be rotated independently thereof by the offset shaft, and contact arms carried by the central shaft and the gear and movable over the resistance elements.

3. A transmitting or receiving instrument embodying an insulator disc, a plurality of resistance elements disposed one above the other on the disc and superposed contact arms rotatably mounted with respect to the disc, the upper arm contacting the lower element and the under arm contacting the upper element.

4. A transmitting or receiving instrument embodying an insulating member, a plurality of resistance elements disposed about the periphery of said member, contact arms movable over the elements, a centrally mounted drive shaft whereby the contact arms are rotated in fixed relation to each other.

5. A transmitting or receiving element embodying a disc, a plurality of resistance elements disposed about the periphery thereof and superposed contact arms mounted on the same side of the disc and movable over the resistance elements.

6. A transmitting or receiving element embodying a disc, a plurality of resistance elements carried thereby and superposed contact arms geared to each other and movable over the resistance elements.

HARRY K. RUTHERFORD.